United States Patent
Zhang et al.

(10) Patent No.: US 12,254,837 B2
(45) Date of Patent: Mar. 18, 2025

(54) DISPLAY PANEL AND DISPLAY DEVICE WITH NON-DISPLAY AREA GATE LINES TO MATCH DISPLAY AREA GATE LINES RC LOAD

(71) Applicants: Hefei BOE Display Technology Co., Ltd., Anhui (CN); BOE Technology Group Co., Ltd., Beijing (CN)

(72) Inventors: Chunxu Zhang, Beijing (CN); Ke Dai, Beijing (CN); Jiantao Liu, Beijing (CN); Lei Guo, Beijing (CN); Maoxiu Zhou, Beijing (CN); Xiaoting Jiang, Beijing (CN); Min Cheng, Beijing (CN); Qi Liu, Beijing (CN)

(73) Assignees: HEFEI BOE DISPLAY TECHNOLOGY CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 18/022,757

(22) PCT Filed: Apr. 21, 2022

(86) PCT No.: PCT/CN2022/088287
§ 371 (c)(1),
(2) Date: Feb. 23, 2023

(87) PCT Pub. No.: WO2023/201656
PCT Pub. Date: Oct. 26, 2023

(65) Prior Publication Data
US 2024/0274084 A1    Aug. 15, 2024

(51) Int. Cl.
*G09G 3/32* (2016.01)
*G09G 3/3266* (2016.01)
*G09G 3/36* (2006.01)

(52) U.S. Cl.
CPC ......... *G09G 3/3266* (2013.01); *G09G 3/3677* (2013.01); *G09G 2300/0417* (2013.01);
(Continued)

(58) Field of Classification Search
CPC ............... G09G 3/3266; G09G 3/3677; G09G 2300/0426; G09G 2300/043;
(Continued)

(56) References Cited

U.S. PATENT DOCUMENTS

| 6,795,049 B2 | 9/2004 | Toyoshima et al. |
| 7,643,003 B2 | 1/2010 | Chun et al. |

(Continued)

FOREIGN PATENT DOCUMENTS

| CN | 1366284 A | 8/2002 |
| CN | 103280196 A | 9/2013 |

(Continued)

OTHER PUBLICATIONS

Written Opinion issued Dec. 8, 2022, in International Application No. PCT/CN2022/088287, 4pp.

*Primary Examiner* — Liliana Cerullo
(74) *Attorney, Agent, or Firm* — XSENSUS LLP (57) ABSTRACT

A display panel, including: a substrate including a display region and a non-display region; a second conductive layer including more than one gate line located in the display region, and more than one virtual gate line located in the non-display region; a virtual conductive part, located in the non-display region, where the virtual conductive part is located in a different conductive layer from the virtual gate line, an orthographic projection of the virtual conductive part on the substrate is located within an orthographic projection of the virtual gate line on the substrate, and the virtual conductive part is configured to form an equivalent (Continued)

capacitance with the virtual gate line; and a RC load of the virtual gate line matches with a RC load of the gate line.

17 Claims, 7 Drawing Sheets

(52) U.S. Cl.
CPC ............... *G09G 2300/0426* (2013.01); *G09G 2300/043* (2013.01); *G09G 2310/0281* (2013.01); *G09G 2320/0223* (2013.01); *G09G 2320/0233* (2013.01)

(58) Field of Classification Search
CPC ... G09G 2310/0281; G09G 2320/0233; G09G 2320/0223
See application file for complete search history.

(56) References Cited

U.S. PATENT DOCUMENTS

| | | | |
|---|---|---|---|
| 10,657,879 | B1 | 5/2020 | Gu et al. |
| 2002/0093474 | A1 | 7/2002 | Toyoshima et al. |
| 2007/0001987 | A1 | 1/2007 | Chun et al. |
| 2013/0050157 | A1* | 2/2013 | Baek .................... G09G 3/2092 345/204 |
| 2017/0205673 | A1* | 7/2017 | Wang .................... G02F 1/1368 |
| 2020/0160774 | A1 | 5/2020 | Gu et al. |

FOREIGN PATENT DOCUMENTS

| | | |
|---|---|---|
| CN | 103280196 B | 2/2016 |
| CN | 109697963 A | 4/2019 |
| EP | 3 709 287 A1 | 9/2020 |
| KR | 20080000770 A | 1/2008 |
| KR | 101245912 B1 | 3/2013 |

* cited by examiner

DISPLAY PANEL AND DISPLAY DEVICE WITH NON-DISPLAY AREA GATE LINES TO MATCH DISPLAY AREA GATE LINES RC LOAD

CROSS REFERENCE

The present disclosure is a National Stage of International Application No. PCT/CN2022/088287, filed on Apr. 21, 2022, and the entire contents of which are incorporated herein by reference.

TECHNICAL FIELD

The present disclosure relates to the field of display technology, and in particular, to a display panel and a display device.

BACKGROUND

Driven by the gate driving signal provided by the gate driving circuit, the display panel sequentially turns on the scanning lines of each row and turns off the scanning lines of other rows, so that the TFTs corresponding to the pixel units in this row are driven to realize row-by-row scanning.

It should be noted that the information disclosed in the above background section is for enhancing the understanding of the background of the present disclosure, and thus may include information that does not constitute the related art known to those of ordinary skill in the art.

SUMMARY

According to an aspect of the present disclosure, there is provided a display panel; the display panel includes a pixel driving circuit and a gate driving circuit; the pixel driving circuit is configured to drive a light-emitting device to emit light; the pixel driving circuit includes a driving transistor; a gate of the driving transistor is connected to a gate line; the gate driving circuit is configured to provide a gate driving signal to the pixel driving circuit; and the display panel further includes: a substrate, where the substrate includes a display region and a non-display region located on a side of the display region; a second conductive layer, located on a side of the substrate, where the second conductive layer includes: more than one gate line, located in the display region, where an orthographic projection of the more than one gate line on the substrate extends along a row direction and is distributed at intervals in a column direction; more than one virtual gate line, located in the non-display region, where an orthographic projection of the more than one virtual gate line on the substrate extends along the row direction and is distributed at intervals in the column direction; the display panel further includes: a virtual conductive part, located in the non-display region, where the virtual conductive part is located in a different conductive layer from the virtual gate line, an orthographic projection of the virtual conductive part on the substrate is located within an orthographic projection of the virtual gate line on the substrate, and the virtual conductive part is configured to form an equivalent capacitance with the virtual gate line; where, a Resistor-Capacitor (RC) load of the virtual gate line matches with a RC load of the gate line; the gate driving circuit includes more than one first Gate driver On Array (GOA) unit and more than one second GOA unit, the first GOA unit is arranged corresponding to the gate line, and the first GOA unit is configured to provide a gate driving signal to the gate line of n-th row and a reset signal to the gate line of (n−i)-th row; the second GOA unit is arranged corresponding to the virtual gate line, one second GOA unit is connected to the virtual gate line of a row and provides a reset signal to the gate line of (N−i)-th row, n is a positive integer greater than or equal to 1 and less than or equal to N, i is a positive integer smaller than n, and N is a total number of rows of the gate line in the display region.

In at least one embodiment of the present disclosure, the virtual gate line includes a first side and a second side oppositely arranged in the column direction, and the virtual conductive part includes a third side and a fourth side oppositely arranged oppositely arranged in the column direction, a distance between an orthographic projection of the first side on the substrate and an orthographic projection of the second side on the substrate is L1, a distance between an orthographic projection of the third side on the substrate and an orthographic projection of the fourth side on the substrate is L2, and L1/L2 is greater than or equal to 1/10 and less than or equal to 1.

In at least one embodiment of the present disclosure, the virtual gate line is provided with a first component part and a second component part, and a width of the first component part in the column direction is smaller than a width of the second component part in the column direction; the virtual conductive part includes a first conductive sub-part and a second conductive sub-part, an orthographic projection of the first conductive sub-part on the substrate is located within an orthographic projection of the first component part on the substrate, an orthographic projection of the second conductive sub-part on the substrate is located within an orthographic projection of the second component part on the substrate.

In at least one embodiment of the present disclosure, a first electrode of the driving transistor is connected to a data line, and the display panel further includes: a third conductive layer, located on a side of the second conductive layer away from the substrate, where the third conductive layer includes: more than one data line, where an orthographic projection of the more than one data line on the substrate extends along the column direction and is distributed at intervals in the row direction, and one data line is connected to a first conductive part and the virtual conductive part in a same column; where, the virtual gate line further includes a third component part, the third component part is connected between the first component part and the second component part, and a width of the third component part in the column direction is less than a width of the first component part in the column direction; an orthographic projection of the third component part on the substrate intersects an orthographic projection of the data line on the substrate, and an orthographic projection of the first component part on the substrate and an orthographic projection of the second component part on the substrate are respectively located on either side of an orthographic projection of the data line on the substrate.

In at least one embodiment of the present disclosure, an orthographic projection of the first conductive sub-part on the substrate is provided with a first extension length in the row direction, and an orthographic projection of the second conductive sub-part on the substrate is provided with a second extension length in the row direction, and the first extension length is smaller than the second extension length.

In at least one embodiment of the present disclosure, a first electrode of the driving transistor is connected to a data line, a second electrode is connected to a pixel electrode; the display panel further includes: a third conductive layer, located on a side of the second conductive layer away from the substrate, where the third conductive layer includes: more than one first conductive part, located in the display region, where the more than one first conductive part is distributed in an array in row and column direction, and the first conductive part is configured to form the first electrode of the driving transistor; more than one second conductive part, located in the display region, where the second conductive part corresponds to the first conductive part one by one and is electrically insulated from the first conductive part, and the second conductive part is configured to form the second electrode of the driving transistor; more than one data line, where an orthographic projection of the more than one data line on the substrate extends along the column direction and is distributed at intervals in the row direction, and one data line is connected to a first conductive part in a same column; a fourth conductive layer, located on a side of the third conductive layer away from the substrate, where the fourth conductive layer includes: more than one pixel electrode, located in the display region, where the more than one pixel electrode is distributed at intervals in row and column direction, an orthographic projection of the pixel electrode on the substrate is located between orthographic projections of adjacent data lines on the substrate and located between orthographic projections of adjacent gate lines on the substrate, and the pixel electrode is connected to the second conductive part by means of a via hole.

In at least one embodiment of the present disclosure, the virtual conductive part is located in the third conductive layer and connected to the data line, the virtual conductive part in a same row is located on a same side of the data line connected to the virtual conductive part, and in adjacent virtual conductive parts of any two rows, two virtual conductive parts connected to a same data line are located on either side of the data line; and an extension length of an orthographic projection of the virtual conductive part on the substrate in the row direction is L3, an interval distance between orthographic projections of adjacent data lines on the substrate in the row direction is L4, and L3/L4 is greater than or equal to 1/8 and less than or equal to 1/2.

In at least one embodiment of the present disclosure, the virtual conductive part is located in the third conductive layer and connected to the data line, the virtual conductive part in a same row is located on a same side of the data line connected to the virtual conductive part, and the virtual conductive part in a same column is connected to a same side of the data line.

In at least one embodiment of the present disclosure, the display panel further includes: a first conductive layer, located between the second conductive layer and the substrate, where the first conductive layer includes: more than one common electrode, distributed in an array in row and column direction, where an orthographic projection of the common electrode on the substrate partially overlaps with an orthographic projection of the pixel electrode on the substrate; a semiconductor layer, located on a side of the second conductive layer away from the substrate, where the semiconductor layer includes: more than one semiconductor structure, where an orthographic projection of the semiconductor structure on the substrate is located within an orthographic projection of the gate line on the substrate, the semiconductor structure is configured to form a channel region of the driving transistor, and partial structure the gate line is configured to form the gate of the driving transistor; the second conductive layer further includes: a common electrode line, extending along the row direction, where the common electrode line is connected to the common electrode in a same row.

In at least one embodiment of the present disclosure, an overlapping area of an orthographic projection of the pixel electrode on the substrate and an orthographic projection of the common electrode on the substrate is S1, an overlapping area of an orthographic projection of the virtual conductive part on the substrate and an orthographic projection of the virtual gate line on the substrate is S2, and S1/S2 is greater than or equal to 1/10 and less than or equal to 1/2.

In at least one embodiment of the present disclosure, the virtual conductive part is located in the first conductive layer or in the third conductive layer or in the fourth conductive layer.

In at least one embodiment of the present disclosure, the first equivalent capacitance includes a first equivalent sub-capacitance between the gate line and the pixel electrode, a second equivalent sub-capacitance between the gate line and the common electrode line, a third equivalent sub-capacitance between the gate line and the data line, a fourth equivalent sub-capacitance between the gate line and the first conductive part, and a fifth equivalent sub-capacitance between the gate and the second conductive part.

In at least one embodiment of the present disclosure, a distance between orthographic projections of adjacent gate lines on the substrate in the column direction is L5, and a distance between orthographic projections of adjacent virtual gate lines on the substrate in the column direction is L6, and L5/L6 is less than or equal to 1/6.

In at least one embodiment of the present disclosure, an orthographic projection pattern of the virtual gate line on the substrate is the same as an orthographic projection pattern of the gate line on the substrate.

The present disclosure further provides a display device, including the display panel described in any embodiment of the present disclosure.

It is to be understood that both the foregoing general description and the following detailed description are exemplary and explanatory and are not restrictive of the present disclosure.

BRIEF DESCRIPTION OF THE DRAWINGS

The accompanying drawings, which are incorporated in and constitute a part of the description, illustrate embodiments consistent with the disclosure and together with the description serve to explain the principles of the disclosure. Obviously, the drawings in the following description are some embodiments of the present disclosure, and for those of ordinary skill in the art, other drawings can also be obtained according to these drawings without creative efforts.

DETAILED DESCRIPTION

Example embodiments will now be described more fully with reference to the accompanying drawings. Example embodiments may, however, be embodied in many forms and should not be construed as limited to the embodiments set forth here; by contrast, these embodiments are provided so that the present disclosure will be thorough and complete, and will fully convey the concept of example embodiments to those skilled in the art. Matched reference numerals in the drawings denote matched or similar structures, and thus their detailed descriptions will be omitted. Furthermore, the drawings are merely schematic illustrations of the present disclosure and are not necessarily drawn to scale.

In the related art, there is a problem of uneven display brightness due to different loads of gate driving signals. The purpose of the present disclosure is to overcome the shortcomings of the above-mentioned related art, and provide a display panel and a display device.

Figure 1:
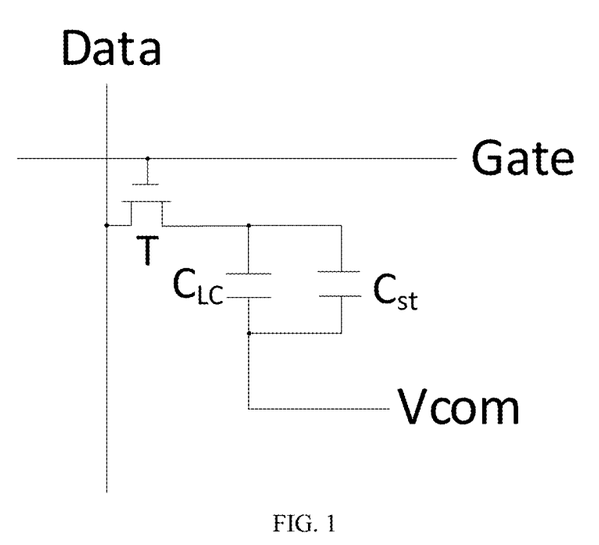
FIG. 1 is a schematic circuit structure diagram of a pixel driving circuit according to some embodiments of the present disclosure.

FIG. 1 is a schematic circuit structure diagram of a pixel driving circuit according to some embodiments of the present disclosure. The pixel driving circuit may include a driving transistor T, the gate of the driving transistor T is connected to the gate driving signal end Gate, the first electrode is connected to the data signal end Vdata, and the second electrode is connected to the pixel electrode Vcom.

Figure 2:
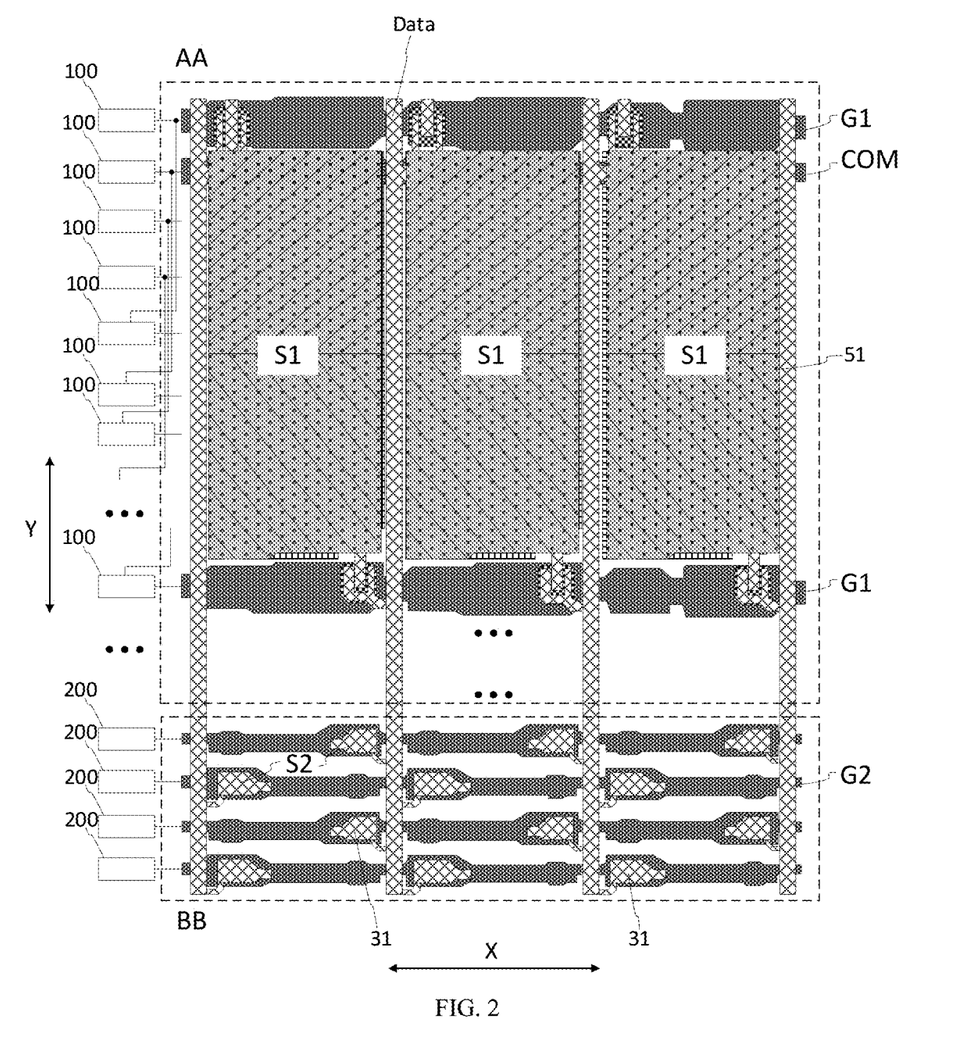
FIG. 2 is a schematic structural diagram of a display panel according to some embodiments of the present disclosure.
Figure 3:
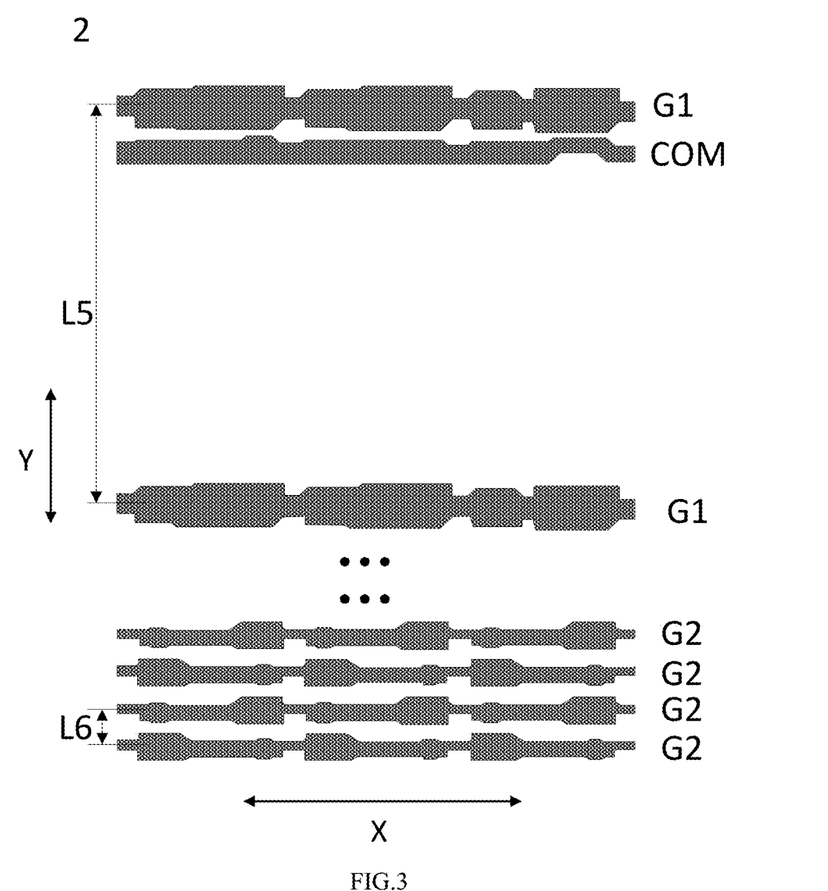
FIG. 3 is a schematic structural diagram of the second conductive layer in FIG. 2.

FIG. 2 is a schematic structural diagram of a display panel according to some embodiments of the present disclosure, and FIG. 3 is a schematic structural diagram of a second conductive layer in FIG. 2. As shown in FIG. 2 and FIG. 3, the display panel provided in some embodiments can include a pixel driving circuit and a gate driving circuit. The pixel driving circuit is used to drive the light-emitting device to emit light, the pixel driving circuit includes a driving transistor T, and the gate of the driving transistor T is connected to the gate line G1. The gate driving circuit is used to provide the gate driving signal to the pixel driving circuit. The display panel can further include: a substrate and a second conductive layer 2. The substrate can include a display region AA and a non-display region BB located on a side of the display region AA. The second conductive layer 2 is located on a side of the substrate, and the second conductive layer 2 may include: more than one gate line G1 and more than one virtual gate lines G2. The more than one gate line G1 is located in the display region AA, and the orthographic projection of the more than one gate line G1 on the substrate extends along the row direction X and is distributed at intervals in the column direction Y. The more than one virtual gate line G2 is located in the non-display region BB, and the orthographic projection of the more than one virtual gate line G2 on the substrate extends along the row direction X and is distributed at intervals in the column direction Y. The display panel may further include a virtual conductive part 31, the virtual conductive part 31 is located in the non-display region BB, the virtual conductive part 31 and the virtual gate line G2 are located in different conductive layers, and the orthographic projection of the virtual conductive part 31 on the substrate is located within the orthographic projection of the virtual gate line G2 on the substrate. The virtual conductive part 31 is used to form an equivalent capacitance with the virtual gate line G2. Among them, the RC load of the virtual gate line G2 matches with the RC load of the gate line G1. The gate driving circuit includes more than one first GOA unit 100 and more than one second GOA unit 200. The first GOA unit 100 is arranged corresponding to the gate line G1, and the first GOA unit 100 is used to provide the gate driving signal to the gate line G1 of the n-th row and the reset signal to the gate line G1 of the (n−i)-th row. The second GOA unit 200 is arranged corresponding to the virtual gate line G2, a second GOA unit 200 is connected to a row of virtual gate line G2 and provides a reset signal to the gate line G1 of the (N−i)-th row, n is a positive integer greater than or equal to 1 and less than or equal to N, i is a positive integer smaller than n, and N is the total number of rows of gate line G1 in the display region AA.

According to the display panel provided by the present disclosure, by means of arranging the virtual gate line G2 and the virtual conductive part 31 in the non-display region BB, an equivalent capacitance is formed by the virtual conductive part 31 and the virtual gate line G2, and the virtual gate line G2 located in the non-display region BB matches with the RC load of the gate line G1 located in the display region AA, so that the load of the first GOA unit 100 matches with the load of the second GOA unit 200, thus solving the problem of uneven display brightness caused by different loads of the GOA units.

As shown in FIG. 2, in some embodiments, the non-display region BB may be located on a side of the display region AA along the column direction Y. The extension length of the virtual gate line G2 in the row direction X may be the same as the extension length of the gate line G1 in the row direction X.

In some embodiments, the gate line G1 forms a first equivalent capacitance with the conductive structure at the corresponding position, and the virtual conductive part 31 forms a second equivalent capacitance with the virtual gate line G2. The RC load of the virtual gate line G2 is the product of the resistance value of the virtual gate line G2 and the second equivalent capacitance, and the RC load of the gate line G1 is the product of the resistance value of the gate line G1 and the first equivalent capacitance. The RC load of the virtual gate line G2 being matched with the RC load of the gate line G1 can be understood as that the resistance value of the virtual gate line G2 is the same as the resistance value of the gate line G1 and the second equivalent capacitance is the same as the first equivalent capacitance; or it may be that the resistance value of the virtual gate line G2 and the second equivalent capacitance correspondingly match with the resistance value of the gate line G1 and the first equivalent capacitance, and the product of the resistance value of the virtual gate line G2 and the second equivalent capacitance is the same as the product of the resistance value of the gate line G1 and the first equivalent capacitance.

In some embodiments, the resistance value of the virtual gate line G2 being matched with the resistance value of the gate line G1 may be understood as that the ratio of the resistance of the virtual gate line G2 to the resistance of the gate line G1 is within a set tolerance range. For example, the tolerance range may be 0.7 to 1.3, and when the ratio of the resistance of the virtual gate line G2 to the resistance of the gate line G1 is greater than or equal to 0.7 and less than or equal to 1.3, it is considered that the resistance value of the virtual gate line G2 is matched with the resistance value of the gate line G1. Similarly, the second equivalent capacitance being matched with the first equivalent capacitance can be understood as that the ratio of the second equivalent capacitance to the first equivalent capacitance is within a set tolerance range. For example, the tolerance range may be 0.7 to 1.3, then when the ratio of the second equivalent capacitance to the first equivalent capacitance is greater than or equal to 0.7 and less than or equal to 1.3, it is considered that the second equivalent capacitance is matched with the first equivalent capacitance. It should be understood that the tolerance range for capacitors may be different from the tolerance range for resistors.

In some embodiments, the gate line G1 forms a first equivalent capacitance with the conductive structure at the corresponding position, and the first equivalent capacitance may include the equivalent capacitance formed by the gate line G1 with other conductive structures X of the same conductive layer and the equivalent capacitance formed by the line G1 with the conductive structure of other conductive layers. Specifically, the equivalent capacitance between the gate line G1 and other structures of the same conductive layer refers to the equivalent capacitance between the line G1 and other conductive structures adjacent to G1 in the second conductive layer 2, and the equivalent capacitance between the gate line G1 and the conductive structure of other conductive layers refers to the equivalent capacitance between the conductive structure in which the orthographic projection of the conductive structure of other conductive layers on the substrate intersects or is adjacent to the orthographic projection of the gate line G1 on the substrate and the gate line G1. It should be understood that, A structure being adjacent to B structure described in some embodiments can be understood as that the orthographic projection of all or part of A structure on the substrate and the orthographic projection of B structure on the substrate are located in the same pixel unit.

It can be understood that, in the gate driving circuit, while the GOA unit of the latter stage provides the gate driving signal to the pixel driving circuit of the present row, it also provides a reset signal to the pixel row driven by the GOA unit of the previous stage. Thus, the GOA units of the last stage or several stages are used to provide the reset signal, and the GOA units of the last stage or several stages that provide the reset signal are the second GOA units 200 described in some embodiments. It can be seen that the second GOA unit 200 is provided with a reset load but with no scanning load, which causes the driving capability of the second GOA unit 200 to be stronger than that of other GOA units (that is, the first GOA unit 100), resulting in the display brightness of the pixel unit of the last row or several rows is different from the display brightness of the pixel unit of other rows.

In some embodiments, by means of arranging a virtual gate line G2 and a virtual conductive part 31 additionally in the non-display region BB, the resistance value of the virtual gate line G2 matches with the resistance value of the gate of a normal pixel row, and the second equivalent capacitance formed by the virtual gate line G2 with the virtual conductive part 31 matches with the first equivalent capacitance formed by the gate line G1 of the normal pixel row. By means of connecting the second GOA unit 200 to the virtual gate line G2, while the second GOA unit 200 is provided with a reset load of a normal pixel row, it is also provided with a scanning load equivalent to that of a normal pixel row, so that the driving capability of the second GOA unit 200 is the same as that of the first GOA unit 100, thus solving the problem that the display brightness of the pixel row reset by the second GOA unit 200 is different from the display brightness of pixel units of other rows.

It should be understood that, in some embodiments, the number of the second GOA unit 200 and the number of the pixel row reset by the second GOA unit 200 are the same as the number of the pixel row spaced between the pixel row driven by one first GOA unit 100 and the reset pixel row. For example, i is 1, that is, one first GOA unit 100 provides a gate driving signal to the pixel driving circuit in the present row and provides a reset signal to the pixel driving circuit in the previous row, then the number of the second GOA unit 200 is 1, that is, one GOA unit provides a reset signal to the pixel driving circuit in the last row of the display region AA; i is 8, that is, one first GOA unit 100 provides a gate driving signal to the pixel driving circuit in the present row and provides a reset signal to the pixel driving circuit in the 8-th row before the present pixel row, then the number of second GOA units 200 is 8, that is, the 8 second GOA units 200 respectively provide reset signals to pixel driving circuits in the last 8 rows of the display region AA.

The display panel provided by some embodiments may be an LCD display panel, and the display panel may be applied to a product with high PPI and high load such as large size of 8k, and the present disclosure is illustrated with a schematic structural diagram of the LCD display panel. It should be understood that the display panel can also be an OLED display panel, by means of arranging a load matching structure in the non-display region of the OLED display panel as the scanning load of the GOA unit that provides a reset signal, and performing load matching of resistance and capacitance, the GOA unit that provides the reset signal is enabled to be provided with a load that matches with that of other GOA units, which can also improve the display uniformity of the OLED display panel and reduce the space occupied by the load.

As shown in FIG. 3, in some embodiments, the second conductive layer 2 includes gate lines G1 located in the display region AA and virtual gate lines G2 located in the non-display region BB. The gate line G1 in the display region AA is used to provide the gate driving signal end Gate in FIG. 1, the gate line G1 is connected to the first GOA unit 100, the gate driving signal is provided to the gate line G1 through the first GOA unit 100, and the semiconductor structure 32 located in the semiconductor layer 3 is controlled to be turned on or off to perform on-off control of the driving transistor T. The virtual gate line G2 is connected to the second GOA unit 200 as a scanning load of the second GOA unit 200, so that the second GOA unit 200 is provided with a total load matching with that of the first GOA unit 100.

As shown in FIG. 3, in some embodiments, the second conductive layer 2 may further include more than one common electrode line COM located in the display region AA. The orthographic projection of the more than one common electrode line COM on the substrate extends along the row direction X and is distributed at intervals in the column direction Y, and the common electrode line COM is not connected to the gate line G1, the common electrode line COM is connected to each isolated common electrode 11 of the first conductive layer 1, and provides a voltage signal to each common electrode 11.

It should be understood that, in some embodiments, a certain structure A extends along direction B means that A may include a main part and a secondary part connected to the main part, the main part is a line, a line segment or a bar-shaped body, the main part extends along direction B, and the length of the main part extending along direction B is greater than the length of the secondary part extending along other directions.

Figure 4:
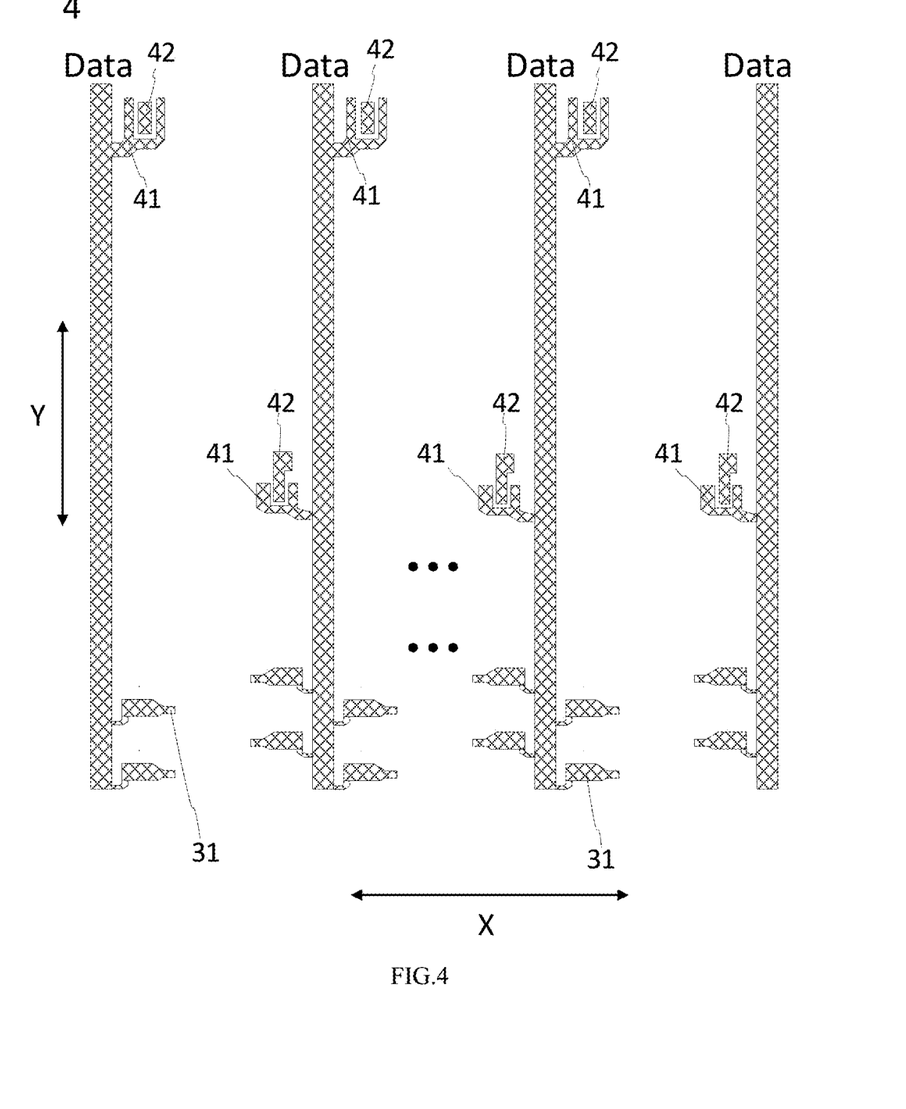
FIG. 4 is a schematic structural diagram of the third conductive layer in FIG. 2.

As shown in FIG. 2, in some embodiments, the display panel may further include a first conductive layer 1, a semiconductor layer 3, a third conductive layer 4 and a fourth conductive layer 5. The first conductive layer 1, the second conductive layer 2, the semiconductor layer 3, the third conductive layer 4, and the fourth conductive layer 5 are sequentially stacked on a side of the substrate, and an insulation layer can be arranged between the above-mentioned functional layers, for example, there may be an insulation layer between the third conductive layer 4 and the fourth conductive layer 5. In some embodiments, the virtual conductive part 31 may be located in the first conductive layer 1 or in the third conductive layer 4 or in the fourth conductive layer 5. The present disclosure takes the virtual conductive part 31 located in the third conductive layer 4 as an example for illustration. FIG. 4 is a schematic structural diagram of the third conductive layer in FIG. 2, FIG. 5 is a schematic structural diagram of the first conductive layer in FIG. 2, FIG. 6 is a schematic structural diagram of the semiconductor layer in FIG. 2, and FIG. 7 is schematic structural diagram of the fourth conductive layer in FIG. 2.

Figure 5:
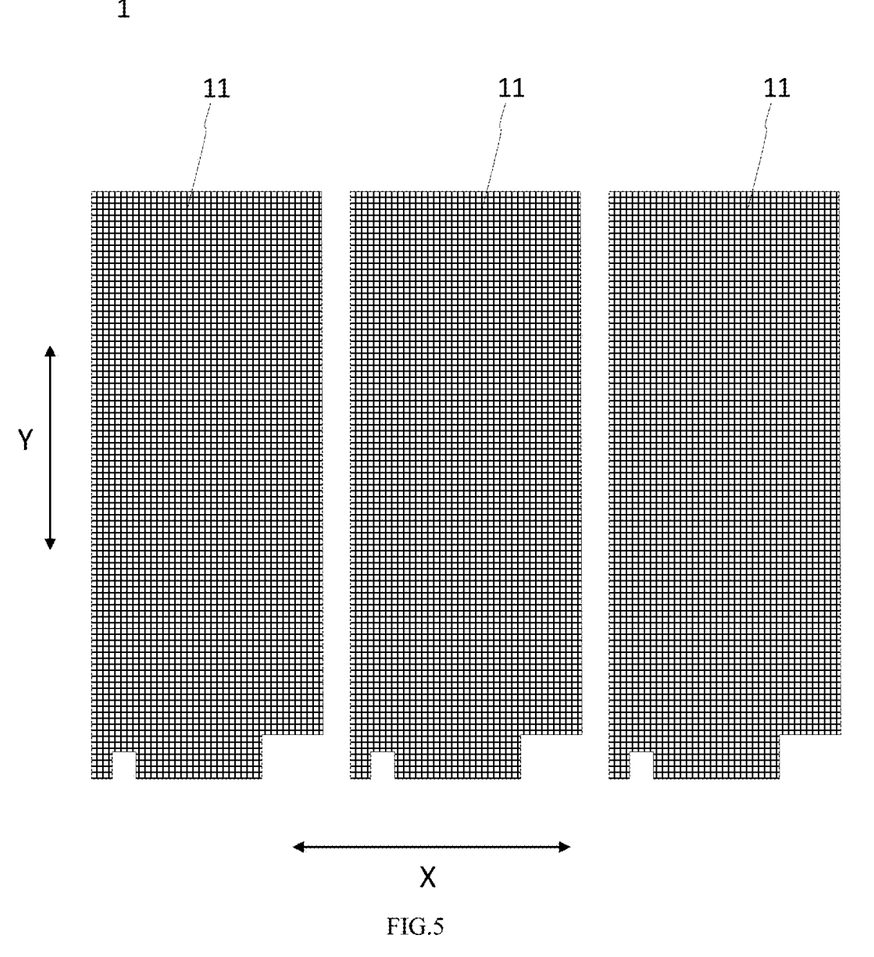
FIG. 5 is a schematic structural diagram of the first conductive layer in FIG. 2.

As shown in FIG. 5, in some embodiments, the first conductive layer 1 may include more than one common electrode 11 located in the display region AA, and the more than one common electrode 11 is distributed in an array in the row and column direction. The orthographic projection of the common electrode line COM in the second conductive layer 2 on the substrate can be located on the orthographic projection of the common electrode 11 on the substrate, and an insulation layer may not be provided between the second conductive layer 2 and the first conductive layer 1, so that the common electrode line COM is connected to each common electrode 11 of the first conductive layer 1. Moreover, the common electrode 11 is not connected to the gate line G1 of the second conductive layer 2, and the orthographic projection of the common electrode 11 on the substrate is located between the orthographic projections of adjacent gate lines G1 on the substrate.

Figure 6:
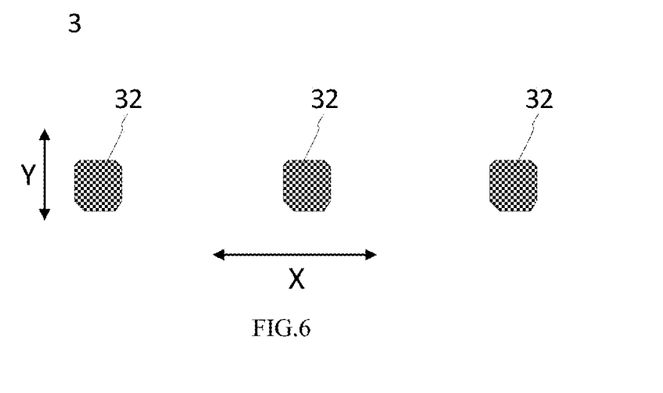
FIG. 6 is a schematic structural diagram of the semiconductor layer in FIG. 2.
Figure 7:
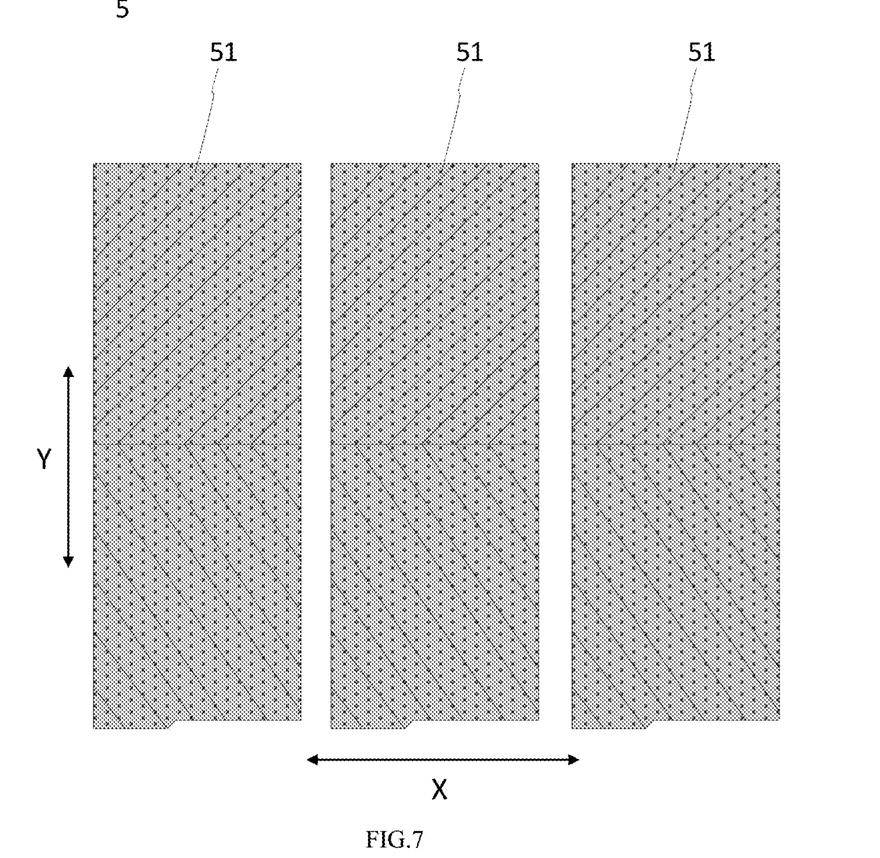
FIG. 7 is a schematic structural diagram of a fourth conductive layer in FIG. 2.

As shown in FIG. 6, in some embodiments, the semiconductor layer 3 includes more than one semiconductor structure 32 distributed in an array in the row and column direction. The semiconductor structure 32 is located in the display region AA and used to form the channel region of the driving transistor T. The orthographic projection of the semiconductor structure 32 on the substrate is located within the orthographic projection of the gate line G1 on the substrate. Partial structures of the gate line G1 form the gate of the driving transistor T, and provide the gate driving signal and reset signal to the gate of the driving transistor T. It can be understood that an insulation layer may be arranged between the semiconductor layer 3 and the second conductive layer 2.

As shown in FIG. 4, in some embodiments, the third conductive layer 4 may include more than one first conductive part 41, more than one second conductive part 42 and more than one data line Data, where, the first conductive part 41 and the second conductive part 42 are all located in the display region AA, and the more than one first conductive part 41 is distributed in an array in the row and column direction. The first conductive part 41 is used to form the first electrode of the driving transistor T. The more than one second conductive part 42 is provided in one-to-one correspondence with the more than one first conductive part 41 and electrically insulated from the first conductive part 41.

The second conductive part 42 is used to form the second electrode of the driving transistor T. The data line Data is used to form the data signal end Vdata in FIG. 1. The orthographic projection of more than one data line Data on the substrate extends along the column direction Y and is distributed at intervals in the row direction X. One data line Data is connected to the first conductive part 41 in the same column, so as to provide a data signal to the first conductive part 41 (that is, the first electrode of the driving transistor T) in the same column. The second conductive part 42 can be connected to the pixel electrode located in the fourth conductive layer 5 by means of a via hole, so as to connect the second electrode of the driving transistor T to the pixel electrode. The orthographic projection of the data line Data on the substrate may be located between the orthographic projections of adjacent common electrodes 11 on the substrate. The third conductive layer 4 may also have a bridging part, and the bridging part may be connected to the common electrode 11 of the first conductive layer 1 by means of a via hole, so as to connect the adjacent common electrodes 11 in the column direction Y by means of the bridging part, so that the common electrode 11 forms a grid structure. In addition, the third conductive layer 4 may also have other structures, such as supporting structures and the like. Furthermore, in some embodiments, the virtual conductive part 31 may be located in the third conductive layer 4 and connected to the data line Data. The distribution relationship of the virtual conductive part 31 relative to the data line Data may be referred to the introduction of the subsequent embodiments, which will not be expanded again here.

As shown in FIG. 7, in some embodiments, the fourth conductive layer 5 may include more than one pixel electrode 51 located in the display region AA, and the more than one pixel electrode 51 is distributed at intervals in the row and column direction. As mentioned above, the pixel electrode 51 may be connected to the second conductive part 42 located in the third conductive layer 4 by means of a via hole to provide a voltage signal to the second electrode of the driving transistor T. As shown in FIG. 7 and FIG. 4, in some embodiments, the pixel electrodes 51 can be provided in one-to-one correspondence with the common electrode 11, and the orthographic projection of the pixel electrode 51 on the substrate overlaps with the orthographic projection of the common electrode 11 on the substrate. The orthographic projection of the pixel electrode 51 on the substrate is located between the orthographic projections of two adjacent data lines Data on the substrate and between the orthographic projections of two adjacent gate lines G1 on the substrate. It should be understood that, in other exemplary embodiments, the pixel electrode 51 may also have other structures, and the present disclosure is not limited to this.

In combination with the above analysis, it can be known that the first equivalent capacitance described in some embodiments may include the equivalent capacitance Cgc between the gate line G1 and the common electrode line COM, the equivalent capacitance of the gate line G1 and the first conductive part 41 (that is, the equivalent capacitance Cgd of the gate line G1 and the first electrode of the driving transistor T), the equivalent capacitance of the gate line G1 and the second conductive part 42 (that is, the equivalent capacitance Cgs of the gate line G1 and the second electrode of the driving transistor T), the equivalent capacitance Cgdx between the gate line G1 and the data line Data, and the equivalent capacitance Cpg between the gate line G1 and the pixel electrode 51.

Furthermore, it can be seen from the above analysis that, the non-display region BB in some embodiments is used for load matching of the gate lines, and the non-display region BB is provided with virtual gate lines G2 in the second conductive layer 2 and is provided with a virtual conductive part 31 in the third conductive layer 4, and the non-display region BB is no longer provided with structures such as TFT and ITO. By means of matching the resistance and capacitance of the virtual gate line G2 with the resistance and capacitance of the gate line of the display region AA, the structure of the non-display region BB can be simplified, and since the structure is simplified, the space occupied by the non-display region BB for load matching can be reduced as much as possible.

As described in the above embodiments, the virtual conductive part 31 can be located in the first conductive layer 1 or the third conductive layer 4 or the fourth conductive layer 5. The present disclosure takes the virtual conductive part 31 located in the third conductive layer 4 as an example in conjunction with the accompanying drawings for further introduction of the structure of the virtual gate line G2 and the virtual conductive part 31.

Figure 8:
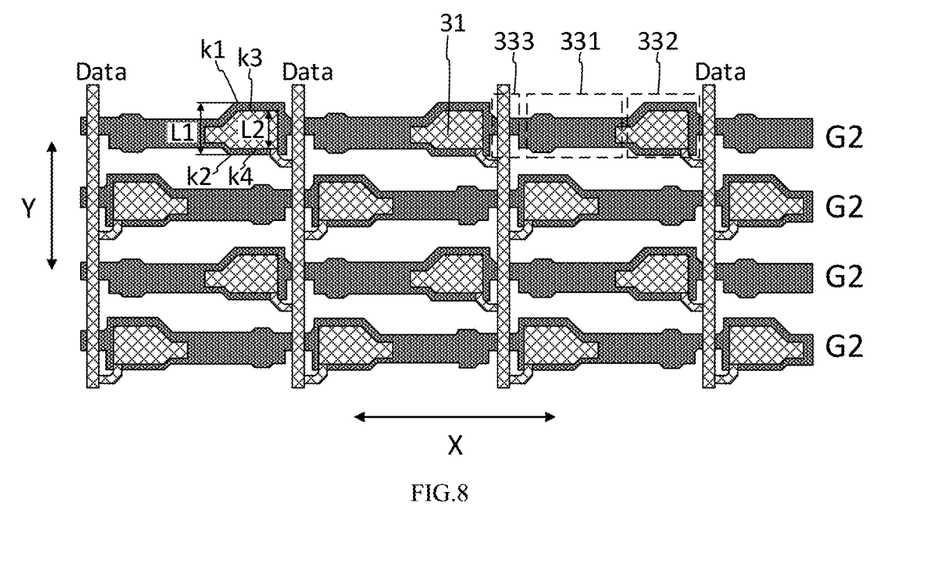
FIG. 8 is a partially enlarged view of the BB region in FIG. 2.

FIG. 8 is a partially enlarged view of the BB area in FIG. 2. As shown in FIG. 8, in some embodiments, the virtual conductive parts 31 can be alternately connected to either side of the data line Data. Specifically, the virtual conductive parts 31 of the same row are located on the same side of the data line Data connected to them, and in the adjacent virtual conductive parts 31 of any two rows, the two virtual conductive parts 31 connected to the same data line Data are located on either side of the data line Data, which is equivalent to that, for each data line Data, the virtual conductive parts 31 connected to it are alternately distributed on either side of the data line Data.

Figure 9:
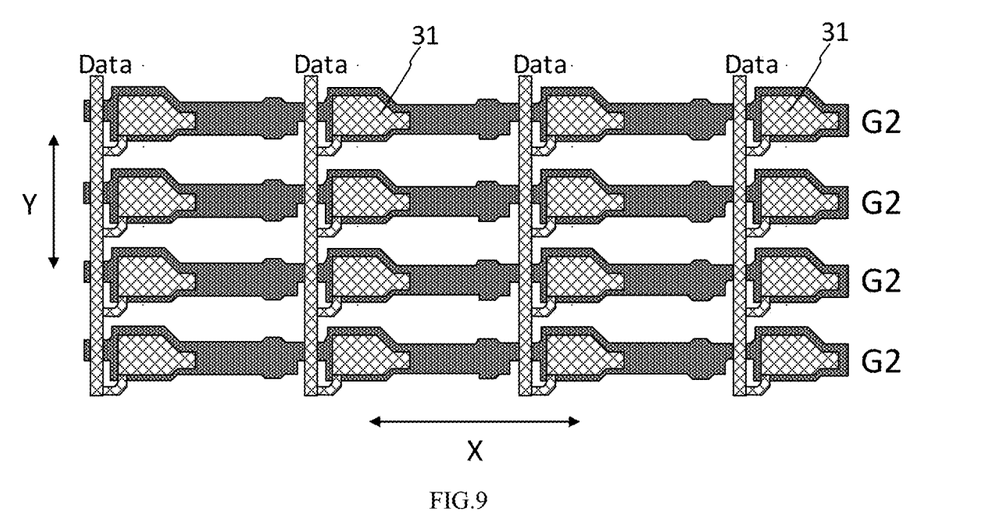
FIG. 9 is a partially enlarged view of the BB region in FIG. 2 according to other embodiment of the present disclosure.

FIG. 9 is a partially enlarged view of the BB region in FIG. 2 according to other embodiments of the present disclosure. As shown in FIG. 9, the virtual conductive parts 31 may be located on the same side of the data line Data. Specifically, the virtual conductive parts 31 of the same row are located on the same side of the data line Data connected to them, and the virtual conductive parts 31 of the same column are connected to the same side of the data line Data. The virtual conductive part 31 connected to the same data line Data will not generate parasitic capacitance, because the signals of two adjacent data lines Data are different, if the distance between them is relatively close, it will easily generate parasitic capacitance. By means of arranging the virtual conductive parts 31 on the same side of the data line Data, the virtual conductive parts 31 of adjacent columns are far apart, so that the formation of parasitic capacitance between the virtual conductive parts 31 of different columns can be avoided.

As shown in FIG. 8, in some embodiments, the virtual gate line G2 may include a first component part 331 and a second component part 332, and the width of the orthographic projection of the first component part 331 on the substrate in the column direction Y is smaller than the width of the orthographic projection of the component part 332 on the substrate in the column direction Y. The virtual conductive part 31 may include a first conductive sub-part and a second conductive sub-part. The orthographic projection of the first conductive sub-part on the substrate is located within the orthographic projection of the first component part 331 on the substrate. The orthographic projection of the second conductive sub-part on the substrate is located within the orthographic projection of the second component part 332 on the substrate, which is equivalent to that the virtual gate line G2 overlaps with the virtual conductive part 31 at the widened position to form a second equivalent capacitance. The orthographic projection of the first conductive sub-part on the substrate has a first extension length in the row direction X, and the orthographic projection of the second conductive sub-part on the substrate has a second extension length in the row direction X, and the first extension length is smaller than the second extension length. By means of overlapping the main part of the virtual conductive part 31 with the virtual gate line G2 at the widened position of the virtual gate line G2 to form a second equivalent capacitance, the extension length of the virtual conductive part 31 in the row direction X can be minimized.

As shown in FIG. 8, in some embodiments, the virtual gate line G2 may further include a third component part 333, and the width of the orthographic projection of the third component part 333 on the substrate in the column direction Y is smaller than the width of the orthographic projection of the first component part 331 on the substrate in the column direction Y, that is, the third component part 333 is the narrowest position of the virtual gate line G2 in the column direction Y. The orthographic projection of the data line Data in the fourth conductive layer 5 on the substrate can overlap with the orthographic projection of the third component part 333 on the substrate. By means of overlapping the data line Data at the narrowest position of the virtual gate line G2, the parasitic capacitance formed by the virtual gate line G2 and the data line Data can be reduced.

In some embodiments, when the virtual conductive parts 31 are distributed on either side of the data line Data as shown in FIG. 8, the length of the virtual conductive part 31 in the row direction X can be set to reduce parasitic capacitance. For example, the extension length of the orthographic projection of the virtual conductive part 31 on the substrate in the row direction X is L3, the interval distance between the orthographic projections of the adjacent data lines Data on the substrate in the row direction X is L4, and L3/L4 can be set to be greater than or equal to 1/8 and less than or equal to 1/2, for example, it can be 1/8, 1/4, 3/8, 1/2, etc. Since the data signals of two adjacent virtual conductive parts 31 in the row direction X are different, by means of setting the ratio of the extension length of the virtual conductive part 31 in the row direction X to the interval between adjacent data lines Data within the above ratio range, it can be avoided that the virtual conductive parts 31 of adjacent rows between the two data lines Data generate parasitic capacitance due to too close distance, or at least the parasitic capacitance generated by the two of them can be reduced. When the virtual conductive parts 31 are distributed on the same side of the data line Data as shown in FIG. 9, as the virtual conductive part 31 will not form parasitic capacitance with the virtual conductive part 31 of other columns, the extension length of the virtual conductive part 31 in the row direction X can be increased, so as to reduce the width of the virtual conductive part 31 in the column direction Y to a certain extent, and reduce the width of the virtual gate line G2 in the column direction Y correspondingly, thus helping to reduce the distance between the adjacent virtual gate line G2, which is equivalent to compressing the space occupied by the virtual gate line G2 and the virtual conductive part 31 in the column direction Y, being beneficial to increase the screen proportion of the display region.

As shown in FIG. 8, in some embodiments, the virtual gate line G2 may include a first side k1 and a second side k2 oppositely arranged in the column direction Y, and the virtual conductive part 31 includes a third side k3 and a fourth side k4 oppositely arranged in the column direction Y. The distance between the orthographic projection of the first side k1 on the substrate and the orthographic projection of the second side k2 on the substrate is L1, and The distance between the orthographic projection of the third side k3 on the substrate and the orthographic projection of the fourth side k4 on the substrate is L2, L1/L2 is greater than or equal to 1/10 and less than or equal to 1, for example, it can be 1/10, 1/5, 3/10, 2/5, 1/2, 3/5, 7/10, 4/5, 9/10, 1, etc. Among them, when L1/L2 is 1, it is equivalent to that the width of the virtual conductive part 31 in the column direction Y is the same as the width of the virtual gate line G2 at the corresponding position in the column direction Y. Obviously, in the case of ensuring that the overlapping capacitance matches with the first equivalent capacitance of the display region matching of AA, by means of widening the width of the virtual conductive part 31 in the column direction Y, it is beneficial to reduce the extension length of the virtual conductive part 31 in the row direction X. When the virtual conductive parts 31 are distributed on either side of the data line Data as shown in FIG. 8, the structure with a shorter extension length of the virtual conductive part 31 in the row direction X is beneficial to reduce the parasitic capacitance generated by the virtual conductive part 31 and the adjacent virtual conductive part 31. When L1/L2 decreases, it means that the orthographic projection of the virtual conductive part 31 on the substrate is located within the orthographic projection of the virtual gate line G2 on the substrate, which is beneficial to reduce the width of the virtual gate line G2 and the virtual conductive part 31 in the column direction Y, thus being beneficial to reduce the display space occupied by the virtual gate line G2 and the virtual conductive part 31 in the column direction Y. The virtual conductive parts 31 can be distributed on the same side of the data line Data as shown in FIG. 9, increasing the utilization rate of the display region AA without increasing the parasitic capacitance.

As shown in FIG. 3, in some embodiments, the interval between the orthographic projections of the adjacent gate lines G1 in the display region AA on the substrate in the column direction Y is L5, the interval between the orthographic projections of the adjacent virtual gate lines G2 in the non-display region BB on the substrate in the column direction Y is L6, and L5/L6 is less than or equal to 1/6, for example, L5/L6 can be 1/15, 1/10, 2/15, 1/6, etc. By means of setting the ratio of the interval distance between the virtual gate line G2 in the non-display region BB to the interval distance between the gate lines G1 in the display region AA within the above ratio range, the occupied space of the non-display region BB in the column direction Y can be fully compressed, which is beneficial to improve the utilization rate of the display region AA.

As shown in FIG. 2, in some embodiments, the overlapping area of the orthographic projection of the pixel electrode 51 on the substrate and the orthographic projection of the common electrode 11 on the substrate is S1, the overlapping area of the orthographic projection of the virtual conductive part 31 on the substrate and the orthographic projection of the virtual gate line G2 on the substrate is S2, and S1/S2 is greater than or equal to 1/10 and less than or equal to 1/2, for example, it can be 1/10, 1/5, 3/10, 2/5, 1/2 etc. By means of setting the overlapping area of the virtual conductive part 31 and the virtual gate line G2 within the above ratio range, the second equivalent capacitance formed by the virtual gate line G2 and the virtual conductive part 31 matches with the first equivalent capacitance formed by the gate line G1 of the display region AA and the metal structure at the corresponding position.

Figure 10:
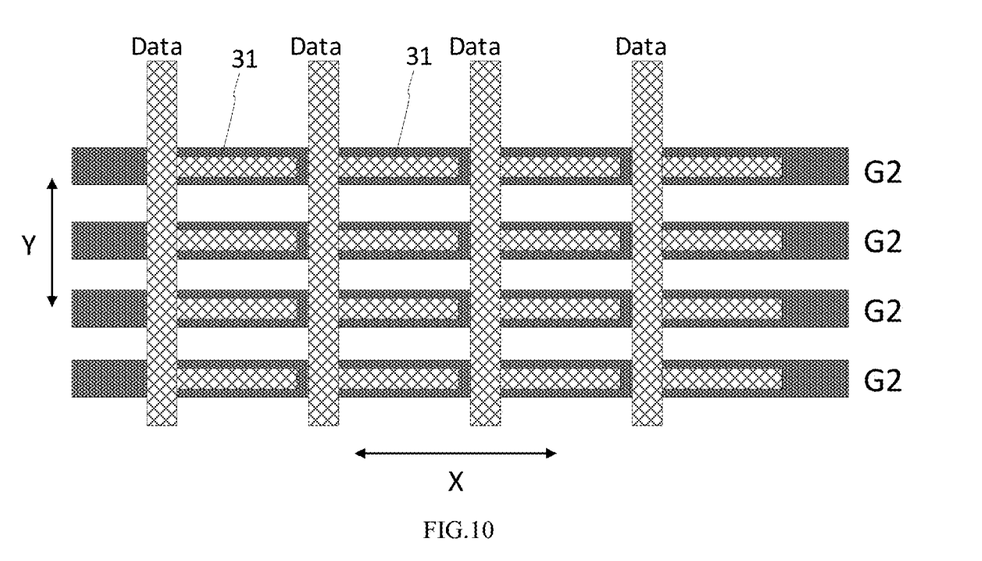
FIG. 10 is a schematic structural diagram of virtual gate lines and virtual conductive parts according to other embodiments of the present disclosure.

It should be understood that, in other exemplary embodiments, the virtual gate line G2 may have other structures other than the structure shown in FIG. 8. For example, it may be a regular pattern. For example, as shown in FIG. 10, the orthographic projection of the virtual gate line G2 on the substrate may be a rectangle. Moreover, it can be understood that the virtual conductive part 31 can also have other structures. For example, the orthographic projection of the virtual conductive part 31 on the substrate can be rectangular as shown in FIG. 9, satisfying the requirement of the orthographic projection of the virtual conductive part 31 on the substrate being located within the orthographic projection of the virtual gate line G2 on the substrate.

In addition, the present disclosure further provides a display device, which includes the display panel described in any of the above-mentioned embodiments of the present disclosure, so that the display device also includes the beneficial effects described in any of the above-mentioned embodiments.

Those skilled in the art will easily think of other embodiments of the present disclosure after considering the description and practicing the present disclosure disclosed here. The present application is intended to cover any variant, use or adaptive change of the present disclosure. These variants, uses or adaptive changes follow the general principles of the present disclosure and include the common knowledge or commonly used technical means in the technical field not disclosed in the present disclosure. The description and embodiments are regarded as illustrative. The true scope and spirit of the disclosure are indicated by the appended claims.

What is claimed is:

1. A display panel, wherein the display panel comprises a pixel driving circuit and a gate driving circuit; the pixel driving circuit comprises a driving transistor; a gate of the driving transistor is connected to a gate line; the gate driving circuit is configured to provide a gate driving signal to the pixel driving circuit; and the display panel further comprises:
    a substrate, wherein the substrate comprises a display region and a non-display region located on a side of the display region;
    a second conductive layer, located on a side of the substrate, wherein the second conductive layer comprises:
    more than one gate line, located in the display region, wherein an orthographic projection of the more than one gate line on the substrate extends along a row direction and is distributed at intervals in a column direction; and
    more than one virtual gate line, located in the non-display region, wherein an orthographic projection of the more than one virtual gate line on the substrate extends along the row direction and is distributed at intervals in the column direction;
    the display panel further comprises:
    a virtual conductive part, located in the non-display region, wherein the virtual conductive part is located in a different conductive layer from the virtual gate line, an orthographic projection of the virtual conductive part on the substrate is located within an orthographic projection of the virtual gate line on the substrate, and the virtual conductive part is configured to form an equivalent capacitance with the virtual gate line;
    wherein, a Resistor-Capacitor (RC) load of the virtual gate line matches with a RC load of the gate line;

the gate driving circuit comprises more than one first Gate driver On Array (GOA) unit and more than one second GOA unit, the first GOA unit is arranged corresponding to the gate line, and the first GOA unit is configured to provide a gate driving signal to the gate line of n-th row and a reset signal to the gate line of (n−i)-th row; and the second GOA unit is arranged corresponding to the virtual gate line, one second GOA unit is connected to the virtual gate line of a row and provides a reset signal to the gate line of (N−i)-th row, n is a positive integer greater than or equal to 1 and less than or equal to N, i is a positive integer smaller than n, and N is a total number of rows of the gate line in the display region;

wherein the virtual gate line comprises a first side and a second side oppositely arranged in the column direction, and the virtual conductive part comprises a third side and a fourth side oppositely arranged in the column direction, a distance between an orthographic projection of the first side on the substrate and an orthographic projection of the second side on the substrate is L1, a distance between an orthographic projection of the third side on the substrate and an orthographic projection of the fourth side on the substrate is L2, and L1/L2 is greater than or equal to 1/10 and less than or equal to 1;

wherein the virtual gate line is provided with a first component part and a second component part, and a width of the first component part in the column direction is smaller than a width of the second component part in the column direction; and the virtual conductive part comprises a first conductive sub-part and a second conductive sub-part, an orthographic projection of the first conductive sub-part on the substrate is located within an orthographic projection of the first component part on the substrate, an orthographic projection of the second conductive sub-part on the substrate is located within an orthographic projection of the second component part on the substrate.

2. The display panel according to claim 1, wherein a resistance value of the virtual gate line matches with a resistance value of the gate line; and the gate line forms a first equivalent capacitance with a conductive structure at a corresponding position, the virtual conductive part forms a second equivalent capacitance with the virtual gate line, and the second equivalent capacitance matches with the first equivalent capacitance.

3. The display panel according to claim 2, wherein a first electrode of the driving transistor is connected to a data line, a second electrode is connected to a pixel electrode, and the display panel further comprises:

a third conductive layer, located on a side of the second conductive layer away from the substrate, wherein the third conductive layer comprises:

more than one first conductive part, located in the display region, wherein the more than one first conductive part is distributed in an array in row and column direction, and the first conductive part is configured to form the first electrode of the driving transistor;

more than one second conductive part, located in the display region, wherein the second conductive part corresponds to the first conductive part one by one and is electrically insulated from the first conductive part, and the second conductive part is configured to form the second electrode of the driving transistor;

more than one data line, wherein an orthographic projection of the more than one data line on the substrate extends along the column direction and is distributed at intervals in the row direction, and one data line is connected to a first conductive part in a same column; and a fourth conductive layer, located on a side of the third conductive layer away from the substrate, wherein the fourth conductive layer comprises:

more than one pixel electrode, located in the display region, wherein the more than one pixel electrode is distributed at intervals in row and column direction, an orthographic projection of the pixel electrode on the substrate is located between orthographic projections of adjacent data lines on the substrate and located between orthographic projections of adjacent gate lines on the substrate, and the pixel electrode is connected to the second conductive part by means of a via hole.

4. The display panel according to claim 3, wherein the virtual conductive part is located in the third conductive layer and connected to the data line, the virtual conductive part in a same row is located on a same side of the data line connected to the virtual conductive part, and in adjacent virtual conductive parts of any two rows, two virtual conductive parts connected to a same data line are located on either side of the data line; and an extension length of an orthographic projection of the virtual conductive part on the substrate in the row direction is L3, an interval distance between orthographic projections of adjacent data lines on the substrate in the row direction is L4, and L3/L4 is greater than or equal to 1/8 and less than or equal to 1/2.

5. The display panel according to claim 3, wherein the virtual conductive part is located in the third conductive layer and connected to the data line, the virtual conductive part in a same row is located on a same side of the data line connected to the virtual conductive part, and the virtual conductive part in a same column is connected to a same side of the data line.

6. The display panel according to claim 3, wherein the display panel further comprises:

a first conductive layer, located between the second conductive layer and the substrate, wherein the first conductive layer comprises:

more than one common electrode, distributed in an array in row and column direction, wherein an orthographic projection of the common electrode on the substrate partially overlaps with an orthographic projection of the pixel electrode on the substrate; and a semiconductor layer, located on a side of the second conductive layer away from the substrate, wherein the semiconductor layer comprises:

more than one semiconductor structure, wherein an orthographic projection of the semiconductor structure on the substrate is located within an orthographic projection of the gate line on the substrate, the semiconductor structure is configured to form a channel region of the driving transistor, and partial structure the gate line is configured to form the gate of the driving transistor;

the second conductive layer further comprises:

a common electrode line, extending along the row direction, wherein the common electrode line is connected to the common electrode in a same row.

7. The display panel according to claim 6, wherein an overlapping area of an orthographic projection of the pixel electrode on the substrate and an orthographic projection of the common electrode on the substrate is S1, an overlapping area of an orthographic projection of the virtual conductive part on the substrate and an orthographic projection of the virtual gate line on the substrate is S2, and S1/S2 is greater than or equal to 1/10 and less than or equal to 1/2.

8. The display panel according to claim 6, wherein the virtual conductive part is located in the first conductive layer or in the third conductive layer or in the fourth conductive layer.

9. The display panel according to claim 6, wherein the first equivalent capacitance comprises a first equivalent sub-capacitance between the gate line and the pixel electrode, a second equivalent sub-capacitance between the gate line and the common electrode line, a third equivalent sub-capacitance between the gate line and the data line, a fourth equivalent sub-capacitance between the gate line and the first conductive part, and a fifth equivalent sub-capacitance between the gate and the second conductive part.

10. The display panel according to claim 1, wherein a first electrode of the driving transistor is connected to a data line, and the display panel further comprises:
    a third conductive layer, located on a side of the second conductive layer away from the substrate, wherein the third conductive layer comprises:
    more than one data line, wherein an orthographic projection of the more than one data line on the substrate extends along the column direction and is distributed at intervals in the row direction, and one data line is connected to a first conductive part and the virtual conductive part in a same column;
    wherein, the virtual gate line further comprises a third component part, the third component part is connected between the first component part and the second component part, and a width of the third component part in the column direction is less than a width of the first component part in the column direction; and
    an orthographic projection of the third component part on the substrate intersects an orthographic projection of the data line on the substrate, and an orthographic projection of the first component part on the substrate and an orthographic projection of the second component part on the substrate are respectively located on either side of an orthographic projection of the data line on the substrate.

11. The display panel according to claim 1, wherein an orthographic projection of the first conductive sub-part on the substrate is provided with a first extension length in the row direction, and an orthographic projection of the second conductive sub-part on the substrate is provided with a second extension length in the row direction, and the first extension length is smaller than the second extension length.

12. The display panel according to claim 1, wherein a distance between orthographic projections of adjacent gate lines on the substrate in the column direction is L5, and a distance between orthographic projections of adjacent virtual gate lines on the substrate in the column direction is L6, and L5/L6 is less than or equal to 1/6.

13. The display panel according to claim 1, wherein an orthographic projection pattern of the virtual gate line on the substrate is the same as an orthographic projection pattern of the gate line on the substrate.

14. A display device, comprising a display panel, wherein the display panel comprises a pixel driving circuit and a gate driving circuit; the pixel driving circuit comprises a driving transistor; a gate of the driving transistor is connected to a gate line; the gate driving circuit is configured to provide a gate driving signal to the pixel driving circuit; and the display panel further comprises:

a substrate, wherein the substrate comprises a display region and a non-display region located on a side of the display region;
a second conductive layer, located on a side of the substrate, wherein the second conductive layer comprises:
more than one gate line, located in the display region, wherein an orthographic projection of the more than one gate line on the substrate extends along a row direction and is distributed at intervals in a column direction; and
more than one virtual gate line, located in the non-display region, wherein an orthographic projection of the more than one virtual gate line on the substrate extends along the row direction and is distributed at intervals in the column direction;
the display panel further comprises:
a virtual conductive part, located in the non-display region, wherein the virtual conductive part is located in a different conductive layer from the virtual gate line, an orthographic projection of the virtual conductive part on the substrate is located within an orthographic projection of the virtual gate line on the substrate, and the virtual conductive part is configured to form an equivalent capacitance with the virtual gate line;
wherein, a Resistor-Capacitor (RC) load of the virtual gate line matches with a RC load of the gate line;
the gate driving circuit comprises more than one first Gate driver On Array (GOA) unit and more than one second GOA unit, the first GOA unit is arranged corresponding to the gate line, and the first GOA unit is configured to provide a gate driving signal to the gate line of n-th row and a reset signal to the gate line of (n−i)-th row; and
the second GOA unit is arranged corresponding to the virtual gate line, one second GOA unit is connected to the virtual gate line of a row and provides a reset signal to the gate line of (N−i)-th row, n is a positive integer greater than or equal to 1 and less than or equal to N, i is a positive integer smaller than n, and N is a total number of rows of the gate line in the display region;
wherein the virtual gate line comprises a first side and a second side oppositely arranged in the column direction, and the virtual conductive part comprises a third side and a fourth side oppositely arranged in the column direction, a distance between an orthographic projection of the first side on the substrate and an orthographic projection of the second side on the substrate is L1, a distance between an orthographic projection of the third side on the substrate and an orthographic projection of the fourth side on the substrate is L2, and L1/L2 is greater than or equal to 1/10 and less than or equal to 1;
wherein the virtual gate line is provided with a first component part and a second component part, and a width of the first component part in the column direction is smaller than a width of the second component part in the column direction; and
the virtual conductive part comprises a first conductive sub-part and a second conductive sub-part, an orthographic projection of the first conductive sub-part on the substrate is located within an orthographic projection of the first component part on the substrate, an orthographic projection of the second conductive sub-part on the substrate is located within an orthographic projection of the second component part on the substrate.

15. The display device according to claim 14, wherein a resistance value of the virtual gate line matches with a resistance value of the gate line; and the gate line forms a first equivalent capacitance with a conductive structure at a corresponding position, the virtual conductive part forms a second equivalent capacitance with the virtual gate line, and the second equivalent capacitance matches with the first equivalent capacitance.

16. The display device according to claim 15, wherein a first electrode of the driving transistor is connected to a data line, a second electrode is connected to a pixel electrode, and the display panel further comprises:

a third conductive layer, located on a side of the second conductive layer away from the substrate, wherein the third conductive layer comprises:

more than one first conductive part, located in the display region, wherein the more than one first conductive part is distributed in an array in row and column direction, and the first conductive part is configured to form the first electrode of the driving transistor;

more than one second conductive part, located in the display region, wherein the second conductive part corresponds to the first conductive part one by one and is electrically insulated from the first conductive part, and the second conductive part is configured to form the second electrode of the driving transistor;

more than one data line, wherein an orthographic projection of the more than one data line on the substrate extends along the column direction and is distributed at intervals in the row direction, and one data line is connected to a first conductive part in a same column; and a fourth conductive layer, located on a side of the third conductive layer away from the substrate, wherein the fourth conductive layer comprises:

more than one pixel electrode, located in the display region, wherein the more than one pixel electrode is distributed at intervals in row and column direction, an orthographic projection of the pixel electrode on the substrate is located between orthographic projections of adjacent data lines on the substrate and located between orthographic projections of adjacent gate lines on the substrate, and the pixel electrode is connected to the second conductive part by means of a via hole.

17. The display device according to claim 16, wherein the display panel further comprises:

a first conductive layer, located between the second conductive layer and the substrate, wherein the first conductive layer comprises:

more than one common electrode, distributed in an array in row and column direction, wherein an orthographic projection of the common electrode on the substrate partially overlaps with an orthographic projection of the pixel electrode on the substrate; and a semiconductor layer, located on a side of the second conductive layer away from the substrate, wherein the semiconductor layer comprises:

more than one semiconductor structure, wherein an orthographic projection of the semiconductor structure on the substrate is located within an orthographic projection of the gate line on the substrate, the semiconductor structure is configured to form a channel region of the driving transistor, and partial structure the gate line is configured to form the gate of the driving transistor;

the second conductive layer further comprises:

a common electrode line, extending along the row direction, wherein the common electrode line is connected to the common electrode in a same row.

* * * * *